United States Patent
Shamblen et al.

(10) Patent No.: US 7,604,680 B2
(45) Date of Patent: *Oct. 20, 2009

(54) PRODUCING NICKEL-BASE, COBALT-BASE, IRON-BASE, IRON-NICKEL-BASE, OR IRON-NICKEL-COBALT-BASE ALLOY ARTICLES BY REDUCTION OF NONMETALLIC PRECURSOR COMPOUNDS AND MELTING

(75) Inventors: Clifford Earl Shamblen, Cincinnati, OH (US); Andrew Philip Woodfield, Cincinnati, OH (US); Eric Allen Ott, Cincinnati, OH (US); Michael Francis Xavier Gigliotti, Glenville, NY (US)

(73) Assignee: General Electric Company, Schenectady, NY (US)

( * ) Notice: Subject to any disclaimer, the term of this patent is extended or adjusted under 35 U.S.C. 154(b) by 875 days.

This patent is subject to a terminal disclaimer.

(21) Appl. No.: 10/814,965

(22) Filed: Mar. 31, 2004

(65) Prior Publication Data
US 2005/0217426 A1    Oct. 6, 2005

(51) Int. Cl.
C22B 3/44 (2006.01)
C22B 3/00 (2006.01)
C22B 5/16 (2006.01)
C22C 1/02 (2006.01)

(52) U.S. Cl. .................... 75/414; 420/590; 75/430
(58) Field of Classification Search .................. 75/367, 75/351, 369, 430, 414; 420/90
See application file for complete search history.

(56) References Cited

U.S. PATENT DOCUMENTS

| | | | |
|---|---|---|---|
| 2,799,570 A | | 7/1957 | Reed et al. |
| 2,828,199 A | | 3/1958 | Findlay |
| 3,000,734 A | * | 9/1961 | Grant et al. .................... 419/10 |
| 3,234,608 A | * | 2/1966 | Peras ........................ 75/10.25 |
| 3,449,115 A | | 6/1969 | Galmiche et al. |
| 3,495,958 A | * | 2/1970 | Talmage ...................... 75/243 |
| 3,886,637 A | * | 6/1975 | Ellis et al. .............. 29/888.061 |
| 3,918,956 A | * | 11/1975 | Baum ........................ 75/10.17 |

(Continued)

FOREIGN PATENT DOCUMENTS

WO    WO 9964638    12/1999

OTHER PUBLICATIONS

ASM Handbook, vol. 7, Powder Metal Technologies and Applications, ASM International, 1998, pp. 112-114 and 167-181.*

(Continued)

*Primary Examiner*—George Wyszomierski
*Assistant Examiner*—Tima M McGuthry-Banks
(74) *Attorney, Agent, or Firm*—McNees Wallace & Nurick LLC

(57) ABSTRACT

A metallic article is produced by furnishing one or more nonmetallic precursor compound comprising the metallic base nickel, cobalt, iron, iron-nickel, or iron-nickel-cobalt, and at least one alloying element. The nonmetallic precursor compound(s) are chemically reduced to produce an initial metallic particle without melting the initial metallic particle. The initial metallic particle is thereafter melted and solidified to produce the metallic article. The melted-and-solidified metal may be used in the as-cast form, or it may be converted to billet and further worked to the final form.

19 Claims, 2 Drawing Sheets

U.S. PATENT DOCUMENTS

| | | | |
|---|---|---|---|
| 4,040,816 A * | 8/1977 | Altenhoner et al. ............ 75/490 |
| 4,373,947 A | 2/1983 | Buttner et al. |
| 4,525,206 A | 6/1985 | Soled et al. |
| 4,606,761 A * | 8/1986 | de Waal et al. ............. 75/10.19 |
| 4,687,632 A | 8/1987 | Hurd et al. |
| 4,820,339 A | 4/1989 | Bienvenu et al. |
| 5,032,176 A | 7/1991 | Kametani et al. |
| 5,320,687 A * | 6/1994 | Kipphut et al. ............. 148/325 |
| 5,322,666 A | 6/1994 | Watwe |
| 5,567,224 A * | 10/1996 | Kundrat ...................... 75/414 |
| 5,778,761 A | 7/1998 | Miller |
| 5,930,580 A | 7/1999 | Everett |
| 5,958,106 A | 9/1999 | Armstrong et al. |
| 6,540,811 B2 | 4/2003 | Inazawa et al. |
| 6,582,651 B1 | 6/2003 | Cochran, Jr. et al. |
| 6,695,930 B2 * | 2/2004 | Kuehmann et al. .......... 148/225 |
| 6,884,279 B2 * | 4/2005 | Woodfield et al. ............ 75/351 |
| 6,926,754 B2 * | 8/2005 | Shamblen et al. ............. 75/765 |
| 7,033,448 B2 * | 4/2006 | Groh et al. .................. 148/677 |
| 2002/0003008 A1 * | 1/2002 | Goecmen et al. ............ 148/325 |
| 2002/0005089 A1 * | 1/2002 | Nagata et al. ................. 75/433 |

OTHER PUBLICATIONS

Tellkamp et al, "Thermal Spraying of Nanocrystalline Inconel 718", Nanostructured Materials, vol. 9, 1997, pp. 489-492.*

Metals Handbook, Desk Edition, 2nd Edition, ASM International, 1998, p. 48.*

The Metals Handbook, Desk Edition, $2^{nd}$ Edition, ASM International, 1998, pp. 8 and 34.*

Metals Handbook, Desk Edition, $2^{nd}$ Edition, ASM International, 1998, pp. 4 and 47.*

Derwent Acc-No. 1982-22788E for JP 57026153 A published Feb. 12, 1982. abstract.*

* cited by examiner

PRODUCING NICKEL-BASE, COBALT-BASE, IRON-BASE, IRON-NICKEL-BASE, OR IRON-NICKEL-COBALT-BASE ALLOY ARTICLES BY REDUCTION OF NONMETALLIC PRECURSOR COMPOUNDS AND MELTING

This invention relates to the production of a metallic article to minimize the presence of melt-related chemical defects and, more particularly, to the manufacture of nickel-base, cobalt-base, iron-base, iron-nickel-base, and iron-nickel-cobalt-base alloy articles.

BACKGROUND OF THE INVENTION

Metallic articles are fabricated by any of a number of techniques, as may be appropriate for the nature of the metal and the article. In one common approach, metal-containing ores are refined to produce a metal. The metal may be further refined as necessary to remove or reduce the amounts of undesirable minor elements. The composition of the refined metal may also be modified by the addition of desirable alloying elements. These refining and alloying steps may be performed during the initial melting process or after solidification and remelting. After a metal of the desired composition is produced, it may be used in the as-cast form for some alloy compositions (i.e., cast alloys), or further worked to form the metal to the desired shape for other alloy compositions (i.e., wrought alloys). In either case, further processing such as heat treating, machining, surface coating, and the like may be employed.

Some of the most demanding applications of materials are in aircraft gas turbine engines. Some examples of materials applications in gas turbine engines include turbine disks made of nickel-base alloys, combustor liners made of cobalt-base alloys, and stationary high-temperature seals made of iron-base alloys. The materials of construction of these components must exhibit the required mechanical properties under these operating conditions.

These components and other articles are typically manufactured by furnishing the metallic constituents of the selected alloy, melting the constituents, and casting the molten mixture into a crucible to form a cast ingot. For some alloy compositions and types of articles, the cast material is used in the cast form. For other alloy compositions and types of articles, the cast ingot is mechanically worked, first by converting it into a billet. The billet is further mechanically worked, typically by forging, rolling, extrusion, or the like, to its final form, and then machined to produce the final cast-and-wrought component.

Small mechanical or chemical defects in the article may cause the article to fail prematurely in service. Mechanical defects include, for example, cracks, voids, ceramic particles that are present from the melting crucible, or dross floating on the surface of the melt. Chemical defects include, for example, elemental segregation that occurs during solidification or undesired chemical species that result from chemical reactions between elements present during the melting process. Both mechanical and chemical defects may cause cracks to form prematurely in engine service. A failure resulting from these defects may be catastrophic to the gas turbine engine and possibly to the aircraft. The manufacturing process must also produce a microstructure in the final article that exhibits the desired combination of mechanical properties and physical properties required in the components.

It has been possible, using existing melting, casting, and conversion practice, to reduce the presence and size of chemical defects in installed components to reasonably low levels. However, there is always a desire and need for a manufacturing process to produce the components with a further reduction in the incidence of such chemical defects, thereby improving the operating margins of safety. The present invention fulfills this need for an improved process, and further provides related advantages.

BRIEF SUMMARY OF THE INVENTION

The present invention provides a method for producing a metallic article with reduced incidence of unacceptably large mechanical and chemical defects. The reduction of the defects also allows economic improvements in the fabrication and operation of the gas turbine engine and other types of articles. The approach is particularly suitable for fabricating articles made of nickel-base alloys such as nickel-base superalloys, cobalt-base alloys, iron-base alloys, nickel-iron-base alloys, and nickel-iron-cobalt-base alloys, by preparation of an initial metallic material, ingot casting, and optional conversion of the ingot to a billet, mechanical working, machining, and ultrasonically inspecting the billet. The resulting metallic article has a desirable microstructure and mechanical properties, as well as a low incidence of unacceptably large chemical defects that, where present, may lead to premature failure of the article in service.

The present method produces a metallic alloy article having a metallic base of a nickel-base, a cobalt-base, an iron-base, an iron-nickel-base, or an iron-nickel-cobalt-base composition. The method comprises the steps of furnishing a nonmetallic precursor compound comprising the metallic base, chemically reducing the nonmetallic precursor compound to produce an initial metallic particle, without melting the initial metallic particle, and melting and solidifying the initial metallic particle to produce the metallic article. The result of the processing is a nickel-base, a cobalt-base, an iron-base, an iron-nickel-base, or an iron-nickel-cobalt-base composition, which may or may not be a superalloy. The step of furnishing the nonmetallic precursor compound may include furnishing two or more nonmetallic precursor compounds supplying different metallic elements of the alloy. Optionally, there may be an addition of a metallic alloying element to the material of the initial metallic particle during the melting step, or there may be no such addition during the melting step. For example, if there is no available reducible source of one or more of the elements, then the remainder of the alloy may be made by the meltless reduction of precursor compounds, and the element that is not available in a reducible form may be added later in the melting step or otherwise.

In another situation where the metallic article is a metallic alloy, the nonmetallic precursor compound may be furnished as a mixture of at least two different nonmetallic precursor compounds together comprising the constituents of the alloy. In an application of most interest, the nonmetallic precursor compound comprises nickel, cobalt, iron, iron-nickel, or iron-nickel-cobalt (or mixtures thereof) as a base, so that the nonmetallic precursor compounds include nickel, cobalt, iron, iron-nickel, and/or iron-nickel-cobalt, and at least one other metallic element.

The nonmetallic precursor compound may be furnished in a finely divided solid form, a liquid form, or a gaseous form. The chemical reduction may be accomplished by any operable technique, with examples being solid-phase reduction, fused salt electrolysis, plasma quench, or vapor-phase reduction.

In an approach of particular interest, the nonmetallic precursor compound in a gaseous form is chemically reduced by contact with a liquid alkali metal and/or a liquid alkaline earth metal. In such an approach, a nonmetallic modifying element such as nitrogen or carbon may be mixed into the nonmetallic precursor compound to produce a desired level in the final metallic material. Such a chemical reduction is accomplished quite rapidly, preferably in a time of less than about 10 seconds, minimizing the time in which chemical defects such as high-melting point inclusions may form.

The step of melting and solidifying is used to form a cast article or ingot of the desired metallic composition. In the case of the cast ingot, the cast ingot may thereafter be converted to a billet by thermomechanical working. The billet is further mechanically worked, and finally machined to make an article such as a gas turbine engine disk. The workpiece is typically ultrasonically inspected as billet, and as a machined article.

The present approach is a hybrid process in which the initial metallic particles are produced without melting, and then the initial metallic particles are melted and solidified. This approach provides significant advantages over alternative approaches for producing metallic articles, which typically melt the starting materials at an early stage of the processing. The present approach achieves a reduced cost because fewer melting steps are used to produce high-quality alloys. The present approach also avoids the use of costly master alloys. Master alloys, which are premelted compositions incorporating elements that are difficult to melt to form homogeneous alloys using conventional melting practices, are widely used in conventional melting practice. The master alloys are usually costly to obtain, increasing the costs of the final product. Further, the master alloying manufacturing process may introduce defects that may be carried into the final product. In the present approach, nonmetallic precursor compounds of most alloying elements are relatively inexpensive, and the required compositions are prepared by simply mixing the nonmetallic precursor compounds. Immiscibility and other problems that necessitate the use of master alloys in conventional melting practice are not present. Master alloys may be used in the subsequent melting, but that use is greatly reduced as compared with conventional practice.

The present approach also avoids many of the mechanical and chemical defects found in conventionally prepared metallic articles. Mechanical defects associated with ceramic-containing melts may be avoided or greatly reduced in most instances. Master alloys are used little if at all, largely avoiding chemical defects that find their origin in the master alloys and the blended materials, and in the chemical inhomogeneities that result from the initial melting. The metallic article is produced with only a single melting, typically without the use of a ceramic crucible. The result is a greatly reduced incidence of ceramic inclusions, which are one of the major concerns for conventionally produced alloys. The improved results are achieved with significantly reduced cost, due to the reduced number of melting steps and the reduced use of master alloys.

Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
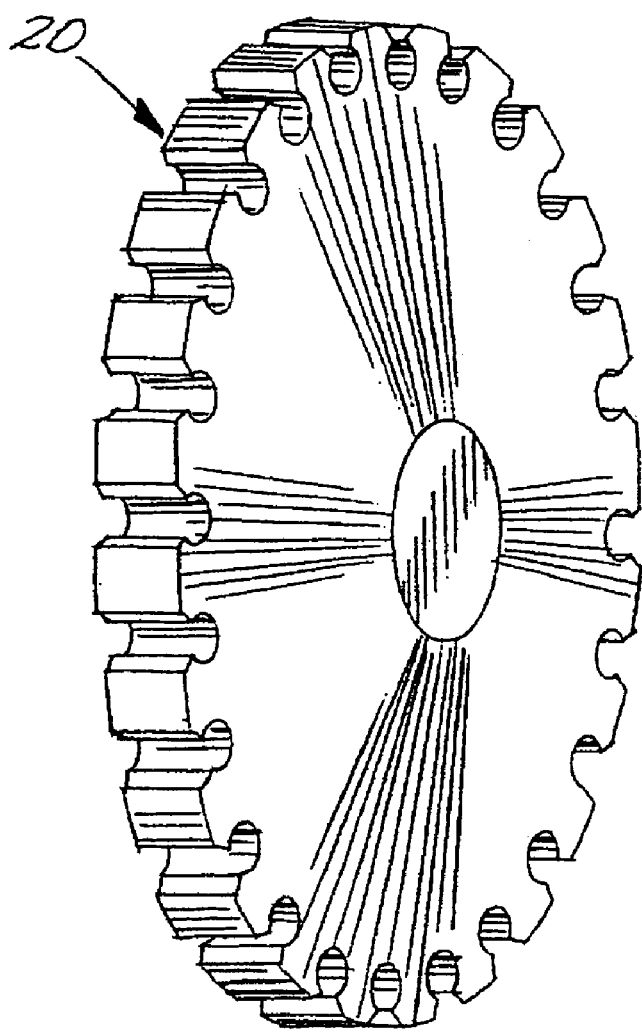
FIG. 1 is a perspective view of a metallic article prepared by the present approach.

The present approach may be used to produce a wide variety of final articles 20. FIG. 1 illustrates one such article 20 of particular interest, a gas turbine engine disk 20 made of a nickel-base alloy such as a nickel-base superalloy. The present approach is not limited to the production of such an article as depicted in FIG. 1, however. Some other examples of gas turbine engine components that may be produced with the present approach are spools, blisks, shafts, blades, vanes, cases, rings, and castings made of nickel-base, cobalt-base, iron-base, iron-nickel-base, or iron-nickel-cobalt-base alloys, as well as structural components for applications other than gas turbine engines such as airframe cast and wrought parts. Such articles are potentially subject to the formation of a variety of mechanical and/or chemical defects. The present approach reduces the incidence of such defects and with reduced costs.

The present approach is most preferably applied to the production of nickel-base, cobalt-base, iron-base, iron-nickel-base, or iron-nickel-cobalt-base superalloys. As used herein, a "superalloy" is a nickel-base, cobalt-base, iron-base, iron-nickel-base, or iron-nickel-cobalt-base alloy having at least two phases, including a continuous matrix phase with a face-centered-cubic crystal structure that is strengthened by both solid solution strengthening and the presence of one or more additional discrete phases that are distributed throughout the matrix phase, where the discrete phases have a different composition than the matrix phase. The strengthening discrete phase or phases present in the superalloy in its fully heat treated, service condition-form, is at least about 5 percent by volume in the case of iron-base superalloys, at least about 10 percent by volume in the case of nickel-base, iron-nickel-base, and iron-nickel-cobalt-base superalloys, and at least about 1 percent by volume in the case of cobalt-base superalloys.

The present approach may be applied to the production of martensitic steels. "Martensitic steel" as used herein is defined as having a composition of an iron-base alloy, wherein iron is present in an amount of at least about 50 percent by weight, which possesses a continuous body-centered cubic (BCC) or body-centered tetragonal (BCT) crystal structure matrix phase. At least about 75 percent by volume of the BCC or BCT matrix phase is present in an acicular phase morphology in the service condition, which develops as a result of a diffusionless phase transformation from the austenitic (face centered cubic, FCC) phase through non-equilibrium accelerated cooling (i.e., quenching). The martensite may or may not be tempered prior to service. The matrix may also contain additional phases in various phase morphologies in the as-quenched condition or after additional heat treatment or heat treatments. Phases such as austenite or ferrite, precipitates such as metal carbides and metal nitrides, and intermetallic compounds such as $Ni_3Mo$, $FeTi$, and $Fe_2Mo$ may be present.

An "X-base" alloy is defined as having more of metallic element(s) X than any other single element, and in many cases has more than 50 percent by weight of element(s) "X". That is, a nickel-base alloy has more nickel than any other element; a cobalt-base alloy has more cobalt than any other element; an iron-base alloy has more iron than any other element; an iron-nickel-base alloy has more of the sum of (iron plus nickel) than any other element or combination of elements; and an iron-nickel-cobalt-base alloy has more of the sum of (iron plus nickel plus cobalt) than any other element or combination of elements.

Figure 2:
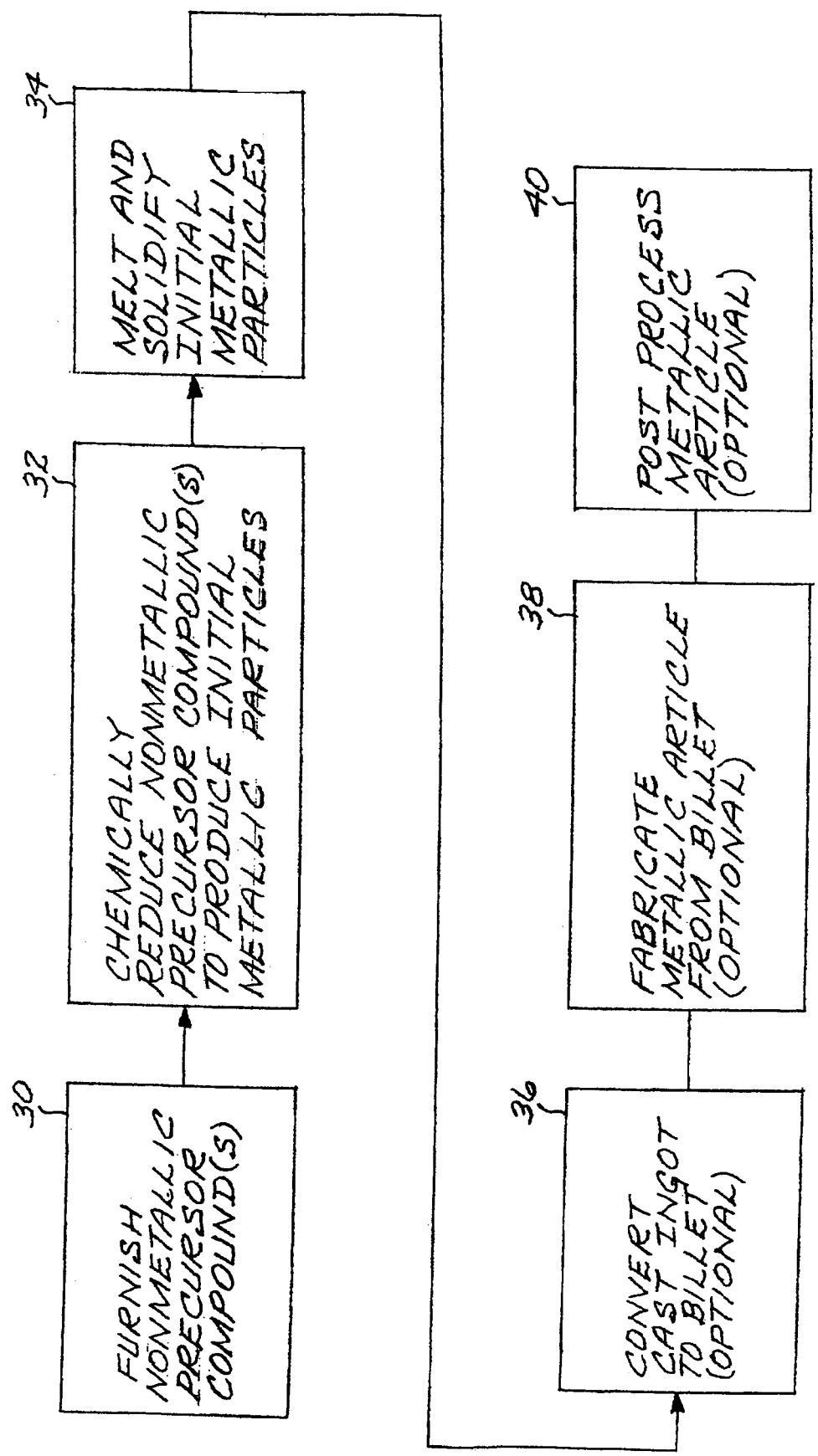
FIG. 2 is a block flow diagram of an approach for practicing the invention.

FIG. 2 illustrates a preferred approach for preparing an article of a base metal and one or more alloying elements. The method comprises providing one or more chemically reducible nonmetallic precursor compounds, step 30. "Nonmetallic precursor compounds" are nonmetallic compounds of the metals that eventually constitute the metallic article 20. Any operable nonmetallic precursor compounds may be used. Reducible oxides of the metals are the preferred nonmetallic precursor compounds in solid-phase reduction, but other types of nonmetallic compounds such as sulfides, carbides, halides, and nitrides are also operable. Reducible halides of the metals are the preferred nonmetallic precursor compounds in vapor-phase reduction.

A single nonmetallic precursor compound may supply a single metallic element. More commonly, the final metallic material is an alloy of two or more metallic elements, including a base metal and at least one metallic alloying element. The base metal is a metal that is present in a greater percentage by weight than any other element in the alloy. The present approach is directed to nickel-base, cobalt-base, iron-base, iron-nickel-base, or iron-nickel-cobalt-base alloy articles. The base-metal precursor compound is present in an amount such that, after the chemical reduction to be described subsequently, there is more of the base metal present in the metallic alloy than any other element. The base metal is nickel, cobalt, or iron, or an appropriate mixture of these metals. The preferred precursor compound that supplies the base is, respectively, nickel oxide, cobalt oxide, or iron oxide (for solid-phase reduction), or nickel chloride, cobalt chloride, or iron chloride (for vapor-phase reduction). The alloying element may be any element that is available in the chemically reducible form of a suitable precursor compound. A few illustrative examples are chromium, tungsten, molybdenum, aluminum, niobium, silicon, tin, zirconium, manganese, and vanadium, but the selection of alloying elements is not limited to this illustrative list.

In the case of the preparation of metallic alloys, the nonmetallic precursor compounds are selected to provide the necessary metals in the final metallic article, and are mixed together in the proper proportions to yield the necessary proportions of these metals in the metallic article. The alloy produced by the present approach is nickel-base, cobalt-base, iron-base, iron-nickel-base, or iron-nickel-cobalt-base. The nonmetallic precursor compounds are selected to provide the necessary metals in the final metallic article, and are mixed together in the proper proportions to yield the necessary proportions of these metals in the final metallic article. For example, if the final article were to have a composition comparable to Alloy 718 and have particular proportions of iron, chromium, niobium plus tantalum, molybdenum, titanium, aluminum, and nickel in the ratio of about 18.8 to about 19 to about 5.1 to about 3 to about 1 to about 0.5 to about 52.5 by weight, the nonmetallic precursor compounds in amounts to provide these proportions of the metallic elements are provided. (Minor alloying elements may also be provided in the precursor compounds.) If there is no available reducible source of one or more of the elements, then the remainder of the alloy may be made by the meltless reduction of precursor compounds, and the element that is not available in a reducible form may be added later in the melting step or otherwise. The precursor compounds are furnished and mixed together in the correct proportions such that the ratio of the desired elements in the mixture of precursor compounds is that required to form the metallic superalloy in the final article. Nonmetallic precursor compounds that serve as a source of more than one of the metals in the final metallic article may also be used. Similar principles apply for other superalloys. Some examples of other superalloys producible by the present approach include the nickel-base superalloys Alloy 706, Alloy 720, WASPALLOY™, GTD222, RENE® 220, RENE® 88, and MERL 76; the cobalt-base superalloys HS188 and L605; the iron-base superalloys A286 and Alloy 909. Some examples of martensitic steels include martensitic stainless steels (e.g., M152 and 410), martensitic precipitation hardening stainless steels (e.g., 17-4PH), semiaustenitic precipitation hardening stainless steels (e.g., AM350 and AM355), maraging steels (e.g., Marage 250 and GE1014), and martensitic low alloy steels (e.g., 4340 and 52100). These alloys are all known compositions that are produced by casting and/or casting and working, but may be produced in an improved manner by the present approach.

The single nonmetallic precursor compound or the mixture of nonmetallic precursor compounds in the case of an alloy are chemically reduced to produce initial metallic particles, without melting the initial metallic particles, step 32. As used herein, "without melting", "no melting", and related concepts mean that the material is not macroscopically or grossly melted for an extended period of time, so that it liquefies and loses its shape. There may be, for example, some minor amount of localized melting as low-melting-point elements melt and are diffusionally alloyed with the higher-melting-point elements that do not melt, or very brief melting for less than about 10 seconds. Even in such cases, the gross shape of the material remains unchanged.

In a preferred reduction approach, termed vapor-phase reduction because the nonmetallic precursor compounds are furnished as vapors or gaseous phase, the chemical reduction may be performed by reducing mixtures of halides of the base metal and the alloying elements using a liquid alkali metal or a liquid alkaline earth metal. For example, halides of the alloying elements are provided as gases. A mixture of these gases in appropriate amounts is contacted to molten sodium, so that the metallic halides are reduced to the metallic form. The metallic alloy is separated from the sodium. This reduction is performed at temperatures below the melting point of the metallic alloy. The approach is described more fully in U.S. Pat. Nos. 5,779,761 and 5,958,106, whose disclosures are incorporated by reference herein in their entirety.

Vapor-phase reduction in step 32 is preferred because of the short reaction times between the gaseous nonmetallic precursor compound(s) and the liquid alkali metal or the liquid alkaline earth metal. This short reaction time, which is desirably less than about 10 seconds, does not permit the creation of large chemical defects in the resulting reduced metal.

Reduction at lower temperatures rather than higher temperatures is preferred. The lower-temperature reduction is more controllable, and also is less subject to the introduction of contamination into the metallic alloy, which contamination in turn may lead to chemical defects. Additionally, the lower temperatures reduce the incidence of sintering together of the particles during the reduction step.

In this vapor-phase reduction approach, a nonmetallic modifying element or compound presented in a gaseous form may be mixed into the gaseous nonmetallic precursor compound prior to its reaction with the liquid alkali metal or the liquid alkaline earth metal. In one example, nitrogen or carbon may be mixed with the gaseous nonmetallic precursor compound(s) to increase the level of nitrogen or carbon, respectively, in the initial metallic particle. Desirably, the nitrogen or carbon is added in a gaseous form that facilitates mixing and minimizes the likelihood of the formation of harmful minor phases in the final article.

In another reduction approach, termed solid-phase reduction because the nonmetallic precursor compounds are furnished as solids, the chemical reduction may be performed by fused salt electrolysis. Fused salt electrolysis is a known technique that is described, for example, in published patent application WO 99/64638, whose disclosure is incorporated by reference herein in its entirety. Briefly, in fused salt electrolysis the mixture of nonmetallic precursor compounds is immersed in an electrolysis cell in a fused salt electrolyte such as a chloride salt at a temperature below the melting temperature of the alloy that forms from the nonmetallic precursor compounds. The mixture of nonmetallic precursor compounds is made the cathode of the electrolysis cell, with an inert anode. The elements combined with the metals in the nonmetallic precursor compounds, such as oxygen in the preferred case of oxide nonmetallic precursor compounds, are removed from the mixture by chemical reduction (i.e., the reverse of chemical oxidation). The reaction is performed at an elevated temperature. The cathodic potential is controlled to ensure that the reduction of the nonmetallic precursor compounds will occur, rather than other possible chemical reactions such as the decomposition of the molten salt. The electrolyte is a salt, preferably a salt that is more stable than the equivalent salt of the metals being refined and ideally very stable to remove the oxygen or other gas to a low level. The chlorides and mixtures of chlorides of barium, calcium, cesium, lithium, strontium, and yttrium are preferred as the molten salt. The chemical reduction may be carried to completion, so that the nonmetallic precursor compounds are completely reduced.

In another reduction approach, termed "rapid plasma quench" reduction, the precursor compound such as the chloride is dissociated in a plasma arc at a temperature of over 4500° C. The precursor compound is rapidly heated, dissociated, and quenched in hydrogen gas. The result is fine metallic-hydride particles. Any melting of the metallic particles is very brief, on the order of 10 seconds or less, and is within the scope of "without melting" and the like as used herein. The hydrogen is subsequently removed from the metallic-hydride particles by a vacuum heat treatment.

Some constituents, termed "other additive constituents", may be difficult to introduce. For example, suitable nonmetallic precursor compounds of the constituents may not be available, or the available nonmetallic precursor compounds of the other additive constituents may not be readily chemically reducible in a manner or at a temperature consistent with the chemical reduction of other nonmetallic precursor compounds, or the other additive constituents may be too costly to add in the usual form. It may be necessary that such other additive constituents ultimately be present as elements in solid solution in the article, as compounds formed by reaction with other constituents of the article, or as already-reacted, substantially inert compounds dispersed through the article. These other additive constituents or precursors thereof may be introduced from the gas, liquid, or solid phase, as may be appropriate, using one of the four approaches subsequently described or other operable approaches.

In a first approach, the other additive constituents are furnished as elements or compounds and are mixed with the precursor compounds prior to or concurrently with the step of chemically reducing. The mixture of precursor compounds and other additive constituents is subjected to the chemical reduction treatment of step 42, but only the precursor compounds are actually reduced and the other additive constituents are not reduced.

In a second approach, the other additive constituents in the form of solid particles are furnished but are not subjected to the chemical reduction treatment. Instead, they are mixed with the initial metallic material that results from the chemical reduction step, but after the step of chemically reducing 42 is complete. This approach is particularly effective when the step of chemically reducing is performed on a flowing powder of the precursor compounds, but it also may be performed on a pre-compacted mass of the precursor compounds, resulting in a spongy mass of the initial metallic material. The other additive constituents are adhered to the surface of the powder or to the surface of, and into the porosity of, the spongy mass.

In a third approach, the precursor compounds are first produced as powder particles by compacting the precursor compounds of the metallic elements. The particles are then chemically reduced. The other additive constituent is thereafter produced at the surfaces of the particles from the gaseous phase. In one technique, a gaseous precursor (e.g., methane) is flowed over surface of particles to deposit the element onto the surface from the gas.

A fourth approach is similar to the third approach, except that the other additive constituent is deposited from a liquid rather than from a gas. The precursor is first produced as powder particles by compacting the precursor compounds of the metallic elements. The particles are then chemically reduced. The other additive constituent is thereafter produced at the surfaces of the particles by deposition from the liquid. In one technique, the particulate is dipped into a liquid solution of a precursor compound of the other additive constituent to coat the surfaces of the particles. The precursor compound of the other additive constituent is second chemically reacted to leave the other additive constituent at the surfaces of the particles. In an example, lanthanum may be introduced into the material by coating the surfaces of the reduced particles with lanthanum chloride. The coated particles are thereafter heated and/or exposed to vacuum to drive off the chlorine, leaving lanthanum at the surfaces of the particles.

Figure 3:
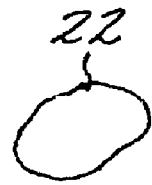
FIG. 3 is an elevational view of an initial nonagglomerated metallic particle.
Figure 4:
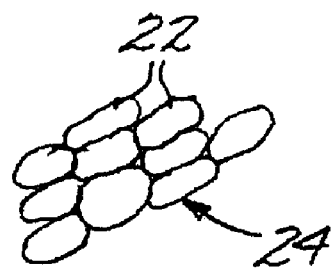
FIG. 4 is an elevational view of a group of initial agglomerated metallic particles.

Whatever the reduction technique used in step 32, the result typically is a plurality of initial metallic particles 22, one of which is shown schematically in FIG. 3 as a free-flowing particle. The particles are preferably generally equiaxed in shape, although they are not necessarily perfectly equiaxed. In other cases, the particles 22 clump together to form agglomerates 24, as shown in FIG. 4. In yet other cases, where pre-compaction has been used, the result is a metallic spongy mass.

The plurality of initial metallic particles 22 are melted and solidified to produce the metallic article, step 34. The melting and solidification 34 may be accomplished without any addition of an additional metallic alloying element to the initial metallic particle in its melted state. The melting and solidification 34 may be accomplished in a single step, or there may be two or more melting and solidification steps 34. The melting may be performed by any operable technique, with vacuum arc melting and electro-slag melting being preferred. Continuous casting using a metallic casting mold may also be used. These techniques and other techniques that do not utilize ceramic crucibles that can result in ceramic-particle contamination of the melt are strongly preferred.

It is preferred for most applications that there be exactly one melting and associated solidification of the metal in step 34, because a significant source of chemical defects may be surface contamination between successive melting steps. However, in other circumstances, where such surface contamination is not a concern or where the contamination may otherwise be controlled, multiple melting and solidification substeps within step 34 may be used.

There may be intentional metallic and other additions to the melt during the melting and solidification step 34. Such additions may be made using master alloys, blending of alloying additions, or any other operable approach. Where there are no such additions, the composition of the final metallic article is determined by the composition of the metallic particles in the reduction step 32.

Whatever the reduction technique used in step 32 and whatever elements may optionally be added in the melting step 34, at the conclusion of step 34 the mixture comprises the desired composition.

The melted-and-solidified article has the desired composition, although it may not have the final desired shape, final properties, and/or microstructure. For example, the article may have a martensitic steel composition, but is not yet a martensitic steel because it does not have the required martensitic microstructure. The solidified metallic article of step 34 may be used in its as-solidified state, as a cast metallic article. If, however, the selected metallic material or alloy is a wrought alloy that is suitable for mechanical working, the solidified metallic material may optionally be further worked to alter its microstructure, modify its mechanical properties, and/or change its shape. In one practice, the metal is solidified in step 34 as a cast ingot. The cast ingot is then converted to a billet, step 36, by mechanical or thermomechanical working, such as by hot forging, upsetting, extrusion, rolling, or the like. These conversion steps may be performed in multiple stages, with appropriate intermediate heat treatments.

The billet is thereafter optionally fabricated into a metallic article, step 38, by any operable technique. Typical fabrication techniques 38 include machining, shaping, forming, coating, and the like. Steps 36 and 38 are used to fabricate a gas turbine engine disk having a shape such as that illustrated in FIG. 1.

The metallic article is optionally post processed, step 40. Such post-processing may include many types of processing, with examples being consolidation as by hot isostatic pressing for as-cast metallic articles, and cleaning, joining, final machining, application of protective coatings, and heat treating. In most cases, the superalloy articles are heat treated by solution treating and ageing to produce a precipitation-hardened microstructure. The various types of post-processing 40 are known in the art for the specific compositions. The martensitic articles are heat treated to produce the acicular microstructure characteristic of a martensite. Such heat treatments are known in the art for the various compositions produced by other techniques, but generally involve heating above a required temperature, known for each composition, and then a relatively rapid cooling (i.e., quenching) to produce the martensitic microstructure. The heat treating may be performed at this point prior to other post-processing, after other post-processing, or between individual post-processing procedures.

The metallic article may be ultrasonically inspected at any stage after it is solidified in step 34. For manufacturing articles such as gas turbine engine disks that are sensitive to the presence of mechanical and/or chemical defects, the metallic article is typically ultrasonically inspected multiple times during steps 36 and 38.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A method for producing a metallic article comprising a metallic base, comprising the steps of furnishing a mixture of at least two nonmetallic precursor compounds together comprising the constituents of the metallic article, wherein the constituents comprise the metallic base selected from the group consisting of nickel, cobalt, iron, iron-nickel, and iron-nickel-cobalt, and mixtures thereof, and at least one alloying element;

chemically reducing the mixture of nonmetallic precursor compounds to produce an initial metallic particle, without melting the initial metallic particle;

melting and solidifying the initial metallic particle to produce a cast ingot of the metallic alloy, wherein the step of melting and solidifying produces an alloy that is a nickel-base superalloy, a cobalt-base superalloy, an iron-base superalloy, an iron-nickel-base superalloy, an iron-nickel-cobalt-base superalloy, or a martensitic steel;

and processing the cast ingot to produce the metallic article, wherein the metallic article is a component of a gas turbine engine, wherein the step of chemically reducing the mixture of nonmetallic precursor compounds is selected from the group consisting of chemically reducing the compound mixture by fused salt electrolysis, chemically reducing the compound mixture by vapor-phase reduction, and chemically reducing the nonmetallic precursor compound by contact with a liquid selected from the group consisting of a liquid alkali metal and a liquid alkaline earth metal.

2. The method of claim 1, wherein the step of melting and solidifying produces an alloy having a martensitic steel composition.

3. The method of claim 1, including an additional step, performed prior to the completion of the step of melting and solidifying, of producing a mixture of a metallic material and another additive constituent.

4. The method of claim 1, wherein the step of chemically reducing includes the step of chemically reducing the compound mixture by fused salt electrolysis.

5. The method of claim 1, wherein the step of chemically reducing includes the step of chemically reducing the compound mixture by vapor-phase reduction.

6. The method of claim 1, wherein the step of chemically reducing includes the step of chemically reducing the nonmetallic precursor compound by contact with a liquid selected from the group consisting of a liquid alkali metal and a liquid alkaline earth metal.

7. The method of claim 1, wherein the step of chemically reducing includes the step of mixing a nonmetallic modifying element into the nonmetallic precursor compound, wherein the nonmetallic modifying element is selected from the group consisting of nitrogen and carbon.

8. The method of claim 1, wherein the step of chemically reducing includes the step of chemically reducing the nonmetallic precursor compound in a time of less than about 10 seconds.

9. The method of claim 1, wherein the step of melting and solidifying includes the step of
melting and solidifying the initial metallic particle to produce the metallic article, without any addition of a metallic alloying element to the initial metallic particle.

10. The method of claim 1, wherein the step of melting and solidifying includes the step of
adding a metallic alloying element to the initial metallic particle while the initial metallic particle is melted.

11. The method of claim 1, wherein the step of melting and solidifying includes the step of
solidifying the metallic article as a cast article.

12. The method of claim 1, wherein the step of melting and solidifying includes the step of
melting and solidifying the initial metallic particle without contacting a ceramic material.

13. The method of claim 1, wherein the step of melting and solidifying includes the step of
adding an alloying element.

14. The method of claim 11, wherein the cast article is a cast ingot, and wherein the method includes an additional step, after the step of melting and solidifying, of
converting the cast ingot into a billet.

15. The method of claim 1, including an additional step, after the step of melting and solidifying, of
mechanically working the metallic article.

16. The method of claim 1, wherein the step of processing includes the step of
post processing the metallic article.

17. The method of claim 1, including an additional step, after the step of melting and solidifying, of
heat treating the metallic article.

18. The method of claim 1, wherein the metallic article is a superalloy composition, and wherein the method includes an additional step, after the step of melting and solidifying, of
solution heat treating and ageing the metallic article.

19. The method of claim 1, wherein the metallic article is a martensitic steel composition, and wherein the method includes an additional step, after the step of melting and solidifying, of
heat treating the metallic article to form a martensitic microstructure, wherein the step of
heating treating includes the steps of heating the metallic article above a required temperature, and
cooling the metallic article.

* * * * *